United States Patent [19]

Junkas

[11] Patent Number: 4,738,048

[45] Date of Patent: Apr. 19, 1988

[54] FISH HOOKING NEEDLE

[76] Inventor: Ronald J. Junkas, 38 W. 108 Rosewood La., Batavia, Ill. 60510

[21] Appl. No.: 83,024

[22] Filed: Aug. 10, 1987

[51] Int. Cl.⁴ .............................................. A01K 83/06
[52] U.S. Cl. ..................................................... 43/44.2
[58] Field of Search ............................... 43/44.2, 43.16

[56]  References Cited

U.S. PATENT DOCUMENTS

| | | | |
|---|---|---|---|
| 389,598 | 9/1888 | Roberts | 43/55 |
| 3,624,950 | 12/1971 | Merckes | 43/44.2 |
| 3,905,149 | 9/1975 | McCloud | 43/44.2 |
| 3,940,870 | 3/1976 | Pettersen | 43/44.2 |
| 4,688,347 | 8/1987 | Krogmann | 43/44.2 |

Primary Examiner—Gene P. Crosby
Attorney, Agent, or Firm—John L. Schmitt

[57]  ABSTRACT

A needle which is particularly adapted for use by sport fishermen to catch game fish includes an elongated wire-like body. Ends of the needle body are shaped into points. An end barb is then formed immediately inward from each end point. The needle further includes a pair of spaced apart intermediate barbs positioned inward from the end barbs. The end barbs and the intermediate barbs each extend outward from the needle body in opposite directions respectively. During use, an end of a fishing line may be knotted about a middle portion of the needle body between the intermediate barbs. Then, the needle may be baited with an earthworm or minnow, for example, and dropped into a game fish containing body of water such as a lake or river to attract a hungry fish. When a fish strikes and swallows the baited needle, one of the pointed ends and end barb typically pierces the mouth of the fish. The end barb prevents retraction of the needle. The hooked fish then may be reeled in and landed.

5 Claims, 1 Drawing Sheet

U.S. Patent  Apr. 19, 1988  4,738,048
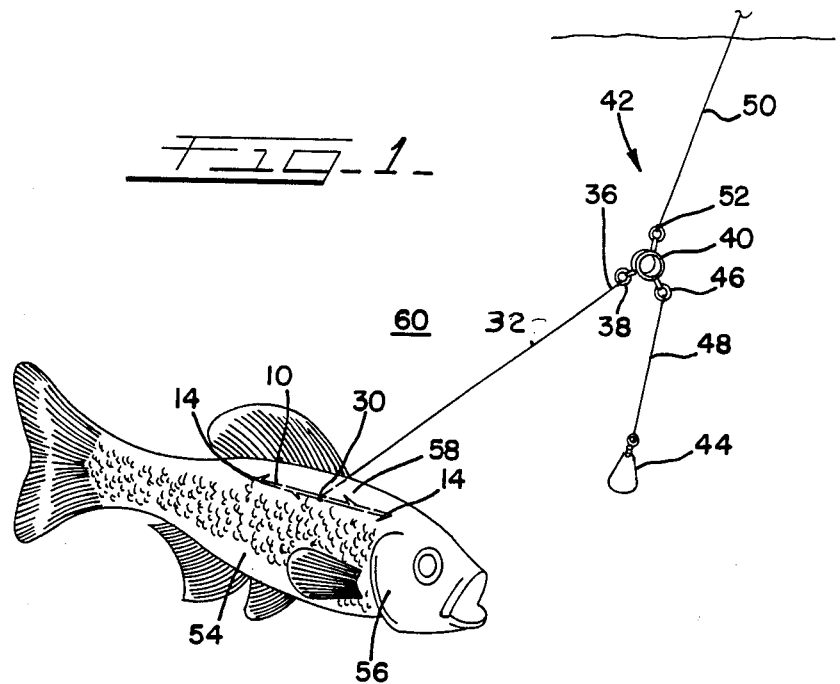
FIG-1-
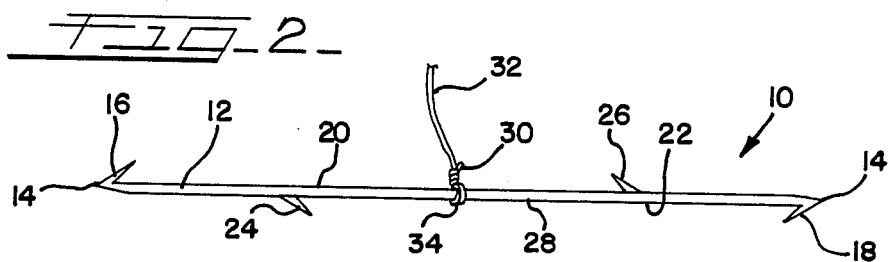
FIG-2-
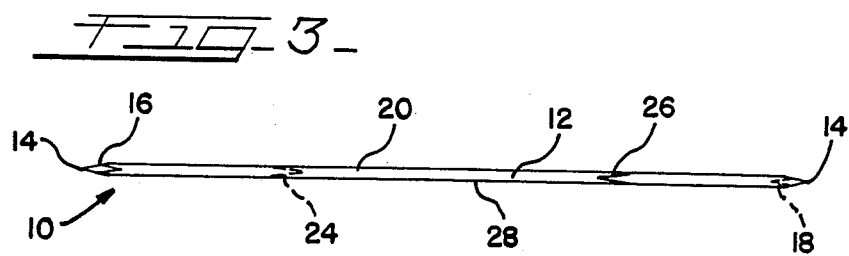
FIG-3-

FISH HOOKING NEEDLE

BACKGROUND OF THE INVENTION

1. Field of the Invention

This invention relates to devices for catching game fish and more particularly to a fish hooking needle to which bait may be attached, which hooks a fish once the fish has swallowed the needle and attached bait, and then allows a fisherman to land the fish by reeling in line connected to the needle.

2. Prior Art

The device universally used for catching game fish is the traditional fish hook. Such a hook has a shank portion formed with an end eyelet for attaching a line or leader, for example. An opposite end of the hook shank is formed into an arcuate shaped bend that terminates at a point. A barb is formed immediately inward from the end point.

Fish hooking devices are available in many other configurations as well. For example, U.S. Pat. No. 1,357,678 discloses a fish hooking device comprising a pair of spaced apart hooks. Inner ends of respective shank portions of each hook in turn are attached to a centrally positioned weight. Another hooking device is set forth in U.S. Pat. No. 2,749,652. This device likewise comprises a pair of hooks. In this case, an end of a shank portion of each hook is connected to a spring. This spring allows the hooks to rotate about the spring to promote release of the hook if it were to snag a foreign object during use. A still further fish hooking device is disclosed in U.S. Pat. No. 4,188,744. In this last case the device comprises two sets of three hooks. The sets are positioned respectively on each side of a fish cake with a line then threaded through the cake and eyelets of the hooks of each set.

After a fish has been caught by a fisherman, the fish may be placed on a stringer. With one end of the stringer secured to a boat holding the fisherman, for example, the fish may be kept fresh by allowing the fish to remain in the water. U.S. Pat. Nos. 389,598, 1,341,722 and 2,477,201 disclose various fish stringers. These stringers may include barbless hooks of varying configurations.

SUMMARY OF THE INVENTION

A hooking needle of this invention is particularly adapted for use by sport fisherman to catch game fish. This needle comprises an elongated wire-like body. Ends of the body are formed into points. Next to each point is a barb. These end barbs extend from opposite sides of the needle body. The needle further includes a pair of spaced apart intermediate barbs. These intermediate barbs are positioned inward respectively from the end barbs to define therebetween a center portion of the needle body. Edges of the end barbs are sharp while edges of the intermediate barbs are dull.

During use, a fisherman first attaches a leader to the needle by knotting an end of a leader about the center portion of the needle body. This leader typically forms part of the fisherman's rigging having varying components which may include a sinker and a swivel, for example. Assuming that an earthworm is to be used as bait, the worm is threaded over one of the pointed ends and onto the needle body until it is next to the knot. Then the worm is stretched so it may be threaded over the other end point. With the bait so attached, the needle and connecting rigging may be dropped into a body of water containing game fish such as a lake or river to await a hungry fish. When a fish strikes and swallows the bait and needle, typically one of the end points pierces a mouth of the fish so that the end point and end barb locate outside of the fish's mouth. As the fisherman reels in the line to land the fish, this end barb inhibits retraction of this end point which could allow the fish to shake the needle loose and escape.

The fish hooking needle of this invention provides game fishermen several advantages over the traditional fish hook presently in use.

A first advantage, which is considerable, is that the hooking needle is snag resistant. A baited needle does not readily snag foreign objects such as a submerged log. Additionally, its elongated shape allows it to pass through heavily weeded areas without entanglement. Note that as a baited needle is drawn through water by a centrally attached line, the needle assumes a position which is only partially out of alignment with the path of movement of the line. Thus, the needle follows the line to avoid entanglements.

Another advantage of this inventive hooking needle is the ease of attaching bait such as an earthworm or minnow to the needle. With respect to an earthworm, the body of such may be easily threaded onto the needle to maintain the worm in its natural elongated state. Thus, to a fish the worm looks like a worm is supposed to look. A worm attached to a traditional hook typically is bent into an irregular, compressed state.

With respect to a minnow, the hooking needle may be readily inserted through a body of the minnow. As is well known, it is most important that this insertion cause minimal injury to the minnow. The minnow must remain alive to be able to swim about if the minnow is to readily attract a hungry game fish. It is often difficult to insert a traditional fish hook into a minnow without causing fatal injury to the minnow.

DESCRIPTION OF THE DRAWINGS

FIG. 1 is a perspective view of a fish hooking needle of this invention baited with a minnow and forming part of a fisherman's rigging.

FIG. 2 is a side elevation view of the fish hooking needle to which an end of a leader of the rigging has been knotted.

FIG. 3 is a top plan view of the needle.

DESCRIPTION OF THE PREFERRED EMBODIMENT

A fish hooking needle of this invention is shown generally in FIGS. 2 and 3 as designated 10. The needle 10 has an elongated wire-like body 12 formed with pointed ends 14. Each pointed end 14 is formed with an end barb 16,18. Note that the end barbs 16,18 extend from opposite sides of the needle body 12. As shown, the end barb 16 extends from an upper side 20 while the end barb 18 extends from a lower side 22 of the body 12.

Spaced inward from the pointed ends 14 are intermediate barbs 24,26. As spaced, the distance between the intermediate barbs 24,26 is about twice as great as the distance between each end and adjacent intermediate barb. The intermediate barbs 24,26 have dull edges to prevent damage to line or a leader attached to a center portion 28 of the body 12, for example. Note that the intermediate barbs 24,26 also extend respectively from opposite sides of the needle body 12. The intermediate barb 24 is joined to the body lower side 22, and the intermediate barb 26 is joined to the body upper side 20. As positioned, the end barb 16 and adjacent intermediate barb 24 extend in opposite directions, and the end barb 18 and adjacent intermediate barb 26 also extend in opposite directions.

As seen generally in FIGS. 1 and 2, an end 30 of a leader 32 has been tied to the needle center portion 28 by a knot 34. A double looped clinch-type knot may be used, for example. An opposite end 36 of the leader 32 is attached to one loop 38 of a 3-loop swivel 40. The leader 32 and swivel 40 form part of a fishing rig 42. This rigging 42 may further include a sinker 44 attached to another loop 46 of the swivel 40 by a length of line 48. An end of a main line 50 then is attached to a third swivel loop 52. An opposite end (not shown) of the main line 50 runs to the fisherman's pole or rod.

As shown in FIG. 1, the ends 14 of the needle 10 have been forced through sides 54 of a body 56 of a minnow 58 so that the leader 32 extends through the minnow's body 56. The needle body 12 then is positioned to fit immediately next to this body 56. The position of the needle body 56 and the end barbs 16,18 inhibit the needle 10 from coming loose. The intermediate barbs 24,26 in turn maintain the positon of the leader knot 34 on the needle center portion 28.

It should be understood that there are a number of ways the needle 10 may be baited with the minnow 58. Regardless of the particular method used, the needle 10 should be placed to minimize injury to the minnow 58. Thus, the minnow 58 remains physically able to swim about in a body of water 60 and remain an attractive target for a larger game fish in search of food.

With the needle 10 so baited, the fish catching rig 42 may be dropped into the body of water 60, for example a lake. Depending on the depth at which game fish are believed to be feeding, the sinker 44 may be allowed to come to rest on a bottom of the lake or above the bottom where the baited needle 10 may drift about.

Assuming that a larger game fish (not shown) swallows the minnow 58 and needle 10, at least one of the needle ends 14 typically passes through a portion of the mouth of the game fish so that, for example, the pointed end 14 and end bar 16 are situated outside of the mouth of the game fish. The barb 16 prevents movement of the needle 10 in a reverse direction. If such reverse movement were to occur, the game fish could disengage from the needle 10 and escape. Thus, with the game fish securely "hooked" the fisherman may reel in the main line 50 and land the game fish.

While an embodiment of this invention has been shown and described, it should be understood that this invention is not limited thereto except by scope of the claims. Various modifications and changes may be made without departing from the scope and spirit of the invention as the same will be understood by those skilled in the art.

What I claim is:

1. A fish hooking needle particularly adapted for use by a sport fisherman, said needle comprising:

an elongated body having ends formed into points, end barbs formed as part of said body and positioned respectively adjacent to said end points, and intermediate barbs formed as part of said body and positioned respectively inward from said end barbs to define a center portion of said body therebetween.

wherein an end of a leader may be knotted about said hooking needle body center portion to provide hooking means for rigging of said fisherman.

2. A hooking needle for catching fish, said needle comprising:

an elongated, wire-like body, points formed on ends of said body respectively, an end barb formed as part of each said end point with said end barbs positioned on opposite sides of said body respectively, and a pair of spaced apart intermediate barbs positioned respectively inward from said end barbs to define a center portion of said body, said intermediate barbs positioned on said opposite sides of said body respectively.

wherein an end of a leader of a fishing rig may be knotted about said needle body center portion, said needle baited and then disposed in a body of water, and said baited needle attracting game fish in said water allowing a game fish that swallows said needle and bait to be hooked and subsequently landed.

3. A hooking needle as defined by claim 2 and further characterized by said intermediate barbs having dull edges to inhibit damage to said attached leader.

4. A hooking needle as defined by claim 2 and further characterized by, each said respective end barb and adjacent intermediate barb extending from said opposite sides of said needle body.

5. A hooking needle as defined by claim 4 and further characterized by, a distance between said intermediate barbs being about twice as great as a distance between said end and adjacent intermediate barbs.

* * * * *